United States Patent [19]
Wild et al.

[11] 3,899,183
[45] Aug. 12, 1975

[54] SLIDE-PROOF BELL AND SPIGOT JOINT FOR PIPES AND TUBULAR ELEMENTS

[75] Inventors: Max Wild, Gelsenkirchen; Wolf-Dieter Schneider, Essen; Friedel Sennlaub, Gelsenkirchen; Rudolf Winter, Wattenscheid, all of Germany

[73] Assignee: Rheinstahl AG, Germany

[22] Filed: Nov. 26, 1973

[21] Appl. No.: 419,143

[30] Foreign Application Priority Data
Nov. 25, 1972 Germany............................ 2257821

[52] U.S. Cl. ............. 277/101; 277/DIG. 2; 285/231
[51] Int. Cl. .............................................. F16j 15/04
[58] Field of Search ........... 285/230, 231, 339, 104, 285/421, 403, 337, 54, 47; 277/207, DIG. 2, 101

[56] References Cited
UNITED STATES PATENTS

| | | | |
|---|---|---|---|
| 3,503,633 | 3/1970 | Braun et al. ........................ | 285/54 |
| 3,684,320 | 8/1972 | Platzer et al. ....................... | 285/403 |
| 3,734,546 | 5/1973 | Herbert et al. ...................... | 285/54 |
| 3,751,078 | 8/1973 | O'Brian et al. ..................... | 285/339 |

*Primary Examiner*—Robert I. Smith
*Attorney, Agent, or Firm*—McGlew and Tuttle

[57] ABSTRACT

A seal ring is interposed between the bell and the spigot and, outwardly of the seal ring, the front end portion of the bell is formed with angularly spaced radial recesses in its inner surface which decrease in radial depth axially toward the end surface of the bell and circumferentially of the bell. Respective wedge shape pieces are inserted axially into the recesses and are firmly seated therein by relative movement circumferentially of the bell. The wedge shape pieces extend axially of the bell and have respective noses projecting from the associated recesses and teeth engaging the spigot end portion and extending substantially circumferentially of the joint. The noses have flange-like projections which extend radially outwardly and parallel to the end surface of the bell, and the axial extent of the wedge shape pieces is of the order of their circumferential extent.

9 Claims, 7 Drawing Figures

SLIDE-PROOF BELL AND SPIGOT JOINT FOR PIPES AND TUBULAR ELEMENTS

FIELD AND BACKGROUND OF THE INVENTION

This invention relates to a bell and spigot joint for pipes and tubular elements, which is secure from sliding and provided with a seal ring inserted between the bell and the spigot end.

To secure such a joint from relative axial sliding of the bell and spigot, it is well known to use annular locking members which are placed in a circular recess axially outwardly of the seal ring and which, due to the recess narrowing in the direction of the bell orifice, are urged toward the spigot end to prevent the same from moving out of the bell, by engaging elevations or depressions provided on the spigot, or merely by friction.

It is known, for example, to insert into the recess an elastic or slotted guard ring engaging a projection provided on the spigot end, such as a circular, closed, or interrupted weld bead, or a ring or a ring segment welded thereon, and backed up, on the other side, by the inclined wall of the recess, as shown in German Utility Model No. 7,203,958.

It is also known to provide recesses at only two circumferentially opposite locations of the bell orifice, and corresponding welded thrust ribs on the spigot end, and after introducing the spigot into the bell and turning it by 90°, to secure the spigot against sliding out of the bell by means of two curved locking members having a constant cross-section and introduced between the recesses and the thrust ribs, as shown in German OS No. 2,016,440.

It is also known to provide the spigot end with projections and to fix it by means of retaining members screwed to the bell orifice, as shown in German O.S. No. 1,775,773.

Another known procedure is to insert a clamping collar into the recess, which latter narrows toward the surface of the bell, so that, at the start of a sliding motion, the collar is pressed against the smooth surface of the spigot and retains it by friction. More particularly, the clamping collar may be roughened or toothed, as shown in German O.S. Nos. 1,954,247, 1,958,205 and 2,034,325.

The mentioned arrangements are disadvantageous, partly because the bell must be substantially longer than normally and partly because, in the direction of the locking ring, the chamber of the seal ring is no longer closed along a part or the entire circumference, so that the seal ring must be retained in its chamber by means of the locking ring and, in case of an increased pressure in the pipe and displacement of the locking ring, the seal ring may move out of its chamber.

In addition, in some arrangements, it is impossible to check the correct position of the seal ring in the chamber after the joint has been assembled. Finally, the known clamping guard rings exhibit the drawback of not coming into effect instantly but only after a certain initial axial displacement.

SUMMARY OF THE INVENTION

The invention is directed to the problem of avoiding the disadvantages of the prior art and of providing a ball and spigot joint, of the mentioned type, which is secure from sliding and in which the elements assuring this security may be mounted in a simple manner without changing the length of the bell and are of such a shape that they can be mounted and dismounted easily and come into full effect immediately after being put into position. Moreover, with identical component parts, the security should be fully effective over the entire tolerance range of a nominal diameter and, if necessary, the same locking members should be usable for different nominal diameters. Also, the joint should be designed so as to permit angular connections, within certain limits.

In accordance with the invention, there are provided wedge shape pieces located outwardly of the seal ring, distributed around the circumference of the joint, and received in recesses which are worked into the end portion of the bell and designed so as to narrow, radially, toward the end surface of the bell, and to narrow, radially, circumferentially toward the inner surface of the bell. The wedge shape pieces are to extend in the axial direction of the pipe joint, and are provided with respective noses projecting from the associated recesses and with an approximately circumferentially oriented toothing engaging the spigot end portion. The wedge shape pieces are adapted to be locked into position by the relative movement circumferentially of the joint. In addition, the wedge shape pieces have an extent, axially of the pipe joint, which is greater or, at the most, only slightly shorter than their extent in the circumferential direction.

To form the recesses, the number of which corresponds to the nominal diameter of the pipe, either only a slight change of the bell casting core box, or an unimportant machining operation on the pipe or tubular element are necessary. The wedge shape pieces which, for example, may be made of casehardened steel, are very inexpensive. They can be set into their position by slight hammer blows in the circumferential direction of the bell, and the teeth of the toothing engage, immediately, the surface of the spigot end portion and secure the same from sliding.

In a variant of this friction type closure locking, in accordance with the invention, the wedge shape pieces do not have any toothing facing the spigot end portion, and this portion is provided with a closed circular weld bead or a welded collar.

In accordance with a further development of the invention, the nose of each wedge shape piece is formed with a flange-like projection extending radially from the piece and parallel to the end surface of the bell. This forms a guide preventing canting of the wedge shape piece in case that it is fixed in the associated recess without the aid of a bolt but directly by hammer blows against its outside.

In accordance with the invention, the curvature along which the recesses become narrow in the circumferential direction toward the inner surface of the bell, as well as the radial narrowing of the recess axially toward the bell orifice, are provided so that, in the circumferential direction, each wedge shape piece is fixed by self-locking, the length of the curvature being so chosen as to assure the clamping of the pieces over the entire tolerance range of the nominal diameter of the pipes.

The bell and spigot joint in accordance with the invention may be made angular, in the usual manner, if the wedge shape pieces are inserted after the parts are arranged angularly. However, to permit an angular joint even after the fixing of the wedge shape pieces, for example following an earth movement, another development of the invention provides that the surface of the outwardly narrowing and circumferentially shallowing inner surface of each recess, as well as the back surface of the associated wedge shape pieces, is of spherical shape, and the toothed surface of each piece is rounded in the axial direction.

The wedge shape pieces may be inserted into the respective recesses before assembly of the pipe joint, with a magnetic retention being provided to facilitate this operation. However, in accordance with a further development of the invention, a window may be provided in the end surface of the bell, at the wider side of the recess, of the size of the cross-section of the wedge shape piece, and through which the pieces may be introduced upon completion of the assembly of the pipes. In this case, it is possible to place the wedge shape pieces in position even if the pipes have been installed originally without such a security against sliding.

In the arrangement of the recesses in accordance with the invention, the chamber for the seal ring is open toward the bell orifice only along a part of its circumference, and the back ends of the wedge shape pieces contribute to the backing up of the seal ring so that, under normal conditions, there is no risk of a seal ring becoming displaced from its chamber. However, in order to prevent such a possibility in any case, even at higher pressures, in accordance with a further development of the invention, a disc is cast integrally with the bell, or inserted subsequently, and separates the chamber of the seal ring from the recesses receiving the wedge shape pieces.

Another objective of the invention is to secure the wedge shape pieces in their set position by additional means, such as spot welding or by a bandage or wrapping embracing all of the pieces.

In accordance with another feature of the invention, in order to separate the bell from the spigot and thus to prevent the transition of leakage currents in the pipe line, the surfaces of the wedge shape pieces engaging the walls of the recesses or the bell are provided with a dielectric layer.

While in plug-in joints, such as those of the Tyton type, the wedge shape pieces are affixed directly to the bell, in threaded and stuffing box joints, the pieces are fixed, in accordance with another development of the invention, to the threaded or gland ring.

An object of the invention is to provide an improved slide-proof bell and spigot joint for pipes and tubular elements.

Another object of the invention is to provide such a joint which is free of the disadvantages of prior art joints of this type.

A further object of the invention is to provide such a joint in which securing elements may be mounted in a simple manner without changing the length of the bell.

Yet another object of the invention is to provide such a joint in which, with identical component parts, the security is fully effective over the entire tolerance range of a nominal diameter.

For an understanding of the principles of the invention, reference is made to the following description of typical embodiments thereof as illustrated in the accompanying drawings.

DESCRIPTION OF THE PREFERRED EMBODIMENTS

Figure 1:
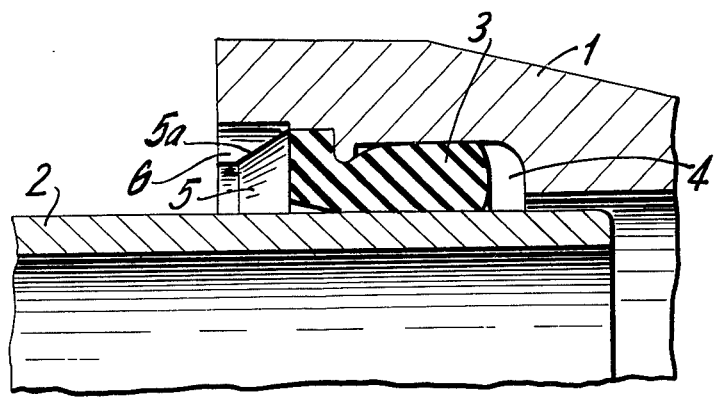
FIG. 1 is a partial axial sectional view of a bell and spigot joint, in which the wedge shape piece has not been inserted, taken along the line A-B of FIG. 6.
Figure 2:
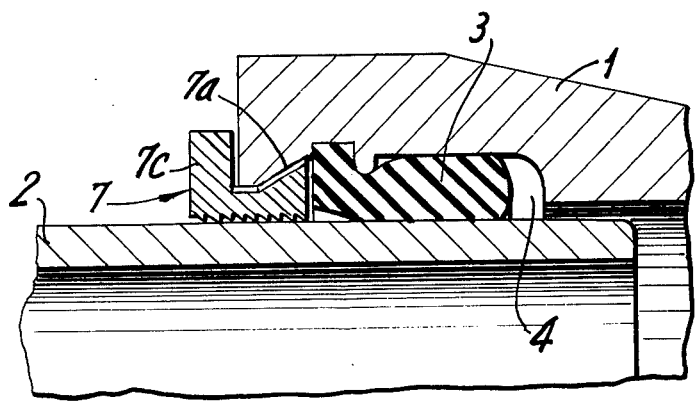
FIG. 2 is a view of the same joint, taken along the line C-D of FIG. 6, and showing an inserted wedge shape piece.

Referring to the drawings, a bell is indicated at 1 and a spigot at 2, and a seal ring 3 is located between bell 1 and spigot 2 in a chamber 4.

In the illustrated example, four recesses 5 are provided axially outwardly of seal ring 3 and distributed, in angularly spaced relation, along the circumference of bell 1. The inner surfaces 5a of the recesses 5 taper, axially outwardly, toward the spigot 2 and, as shown in FIG. 6, the recesses 5 are arcuate and decrease in radial depth in the circumferential direction and toward the inner surface of bell 1.

Axially extending wedge shape pieces 7 are received in recesses 5, and their radially outer surfaces 7a are conformable to surfaces 5a of the recesses 5. On their surfaces facing the end of spigot 2, wedge shape pieces 7 are formed with teeth 7b defining a toothing which is vaulted in the circumferential direction and, in the present example, in addition rounded or arcuate in the axial direction. On their outer ends, the wedge shape pieces 7 are formed with flange-like projections 7c extending radially outwardly and parallel to the end surface of bell 1. These projections serve to guide the wedge shape pieces during their setting into position, which is performed in the circumferential direction.

The surface 5a of each recess 5, as well as the radially outer surface 7a of each wedge shaped piece 7 engageable therewith, may be of spherical shape in order to permit a subsequent angular adjustment of the bell and spigot joint.

Figure 6:
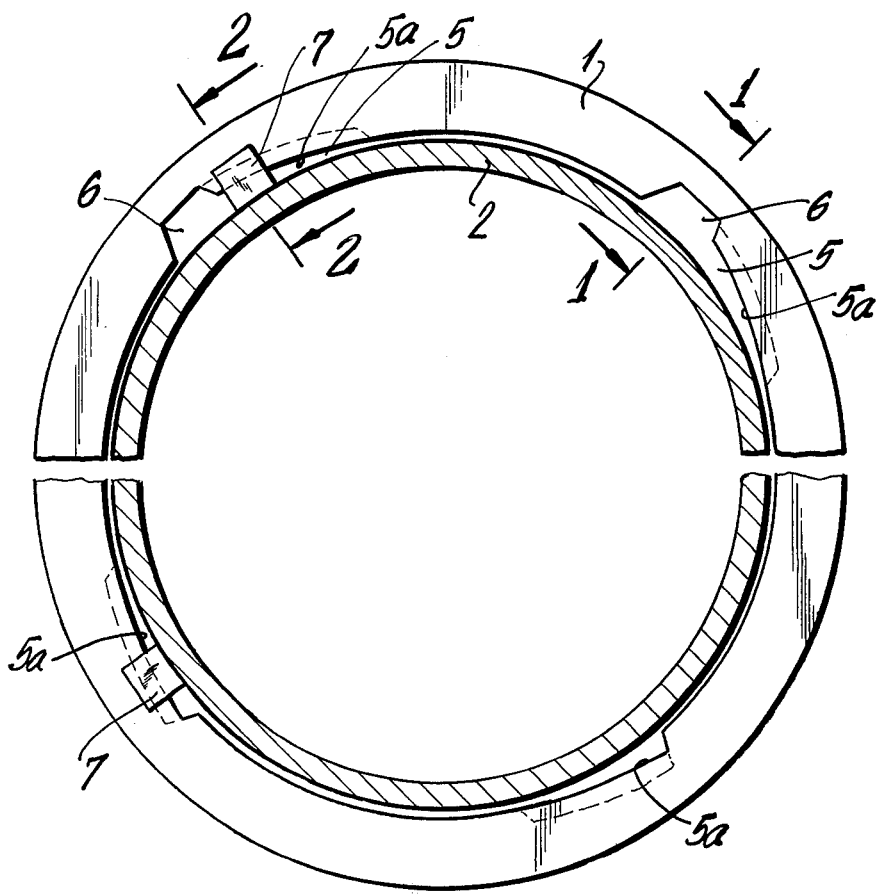
FIG. 6 is an end elevation view of the outer end surface of the bell provided with two different types of recesses, partly with and partly without inserted wedge shape pieces.

In the embodiment of the invention shown in FIG. 1 and in the upper part of FIG. 6, recesses 5 are provided, at their radially wider ends, with windows 6 having a size corresponding to wedge shape pieces 7 and through which the latter may be introduced into the recesses 5 during assembly of the pipes or tubular elements.

Figure 3A:
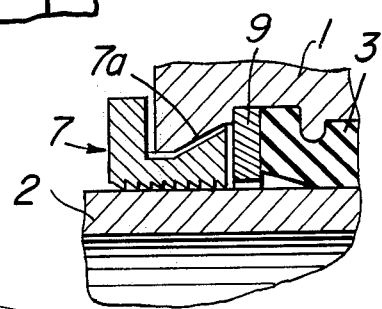
FIG. 3a is a view similar to FIG. 2 of still another variation.
Figure 3:
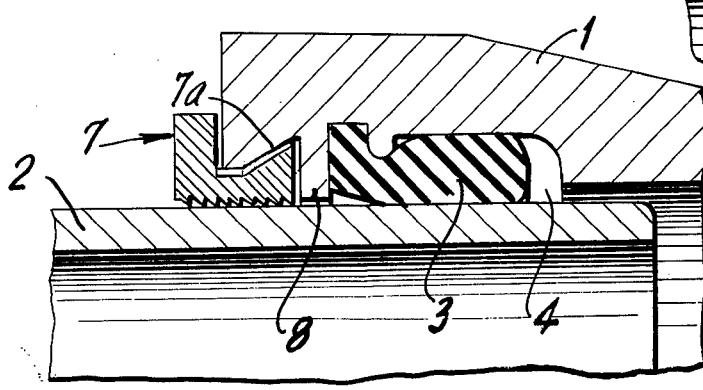
FIG. 3 is a view, similar to FIG. 2, illustrating a variation of the bell and spigot joint.
Figure 4:
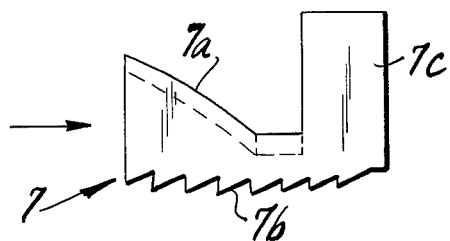
FIG. 4 is an enlarged side elevation view of a wedge shape piece.
Figure 5:
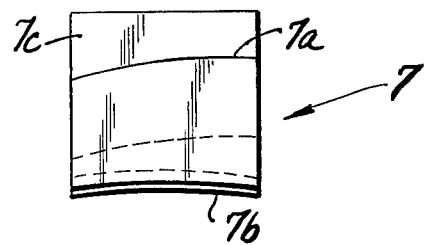
FIG. 5 is an end elevation view of the wedge shape piece of FIG. 4, taken in the direction of the arrow.

In the embodiment of the invention shown in FIG. 3, an additional partition wall 8 is provided between seal ring chamber 4, for seal ring 3, and the recesses 5. This partition wall 8 may be either a radially inwardly extending annular rim formed integrally with bell 1 or an inserted ring.

On their surfaces contacting recesses 5 and bell 1, wedge shape pieces 7 may be provided with an electrically insulating, or dielectric, layer.

In FIG. 3a the bell 1 is formed with a recess receiving a seal ring 9 which separates the chamber axially from the recesses.

In contrast to known arrangements, the security arrangement of the present invention permits a checking of the correct position of the seal ring both before and after the fixing in place of the wedge shape pieces.

While specific embodiments of the invention have been shown and described in detail to illustrate the application of the principles of the invention, it will be understood that the invention may be embodied otherwise without departing from such principles.

What is claimed is:

1. In a slide-proof bell and spigot joint, for pipes and tubular elements, of the type having a seal ring between the bell and the spigot and securing elements located axially outwardly of the seal ring and pressed against the spigot end portion, the improvement comprising, in combination, the outer end portion of the bell being formed with angularly spaced radial recesses in its inner surface which decrease in radial depth axially toward the outer end surface of the bell and circumferentially of the bell; and respective wedge shape pieces inserted axially into said recesses and firmly seated therein by relative movement circumferentially of the bell; said wedge shape pieces having a nose projecting from the associated recess and teeth engaging the spigot end portion and extending substantially circumferentially of the joint.

2. In a slide-proof bell and spigot joint, for pipes and tubular elements, of the type having a seal ring between the bell and the spigot and securing elements located axially outwardly of the seal ring and pressed against the spigot end portion, according to claim 1, in which said wedge shape pieces have an extent, axially of the joint, of the order of their extent circumferentially of the joint.

3. In a slide-proof bell and spigot joint, for pipes and tubular elements, of the type having a seal ring between the bell and the spigot and securing elements located axially outwardly of the seal ring and pressed against the spigot end portion, according to claim 1, in which said wedge shape pieces have an extent, axially of the joint, which is greater than their extent circumferentially of the joint.

4. In a slide-proof bell and spigot joint, for pipes and tubular elements, of the type having a seal ring between the bell and the spigot and securing elements located axially outwardly of the seal ring and pressed against the spigot end portion, according to claim 1, in which said wedge shape pieces have an extent, axially of the joint, which is slightly smaller than their extent circumferentially of the joint.

5. In a slide-proof bell and spigot joint, for pipes and tubular elements, of the type having a seal ring between the bell and the spigot and securing elements located axially outwardly of the seal ring and pressed against the spigot end portion, according to claim 1, in which the nose of each wedge shape piece is formed with a flange-like projection extending radially outwardly therefrom and parallel to the end surface of the bell.

6. In a slide-proof bell and spigot joint, for pipes and tubular elements, of the type having a seal ring between the bell and the spigot and securing elements located axially outwardly of the seal ring and pressed against the spigot end portion, according to claim 1, in which said radially outer surfaces of said recesses tapering toward the inner surface of the bell axially toward the outer end of the bell, and tapering toward the inner surface of the bell circumferentially of the bell, are of a spherical shape; the radially outer surfaces of said wedge shape pieces having a conforming spherical shape; the toothed radially inner surfaces of said wedge shape pieces being arcuate axially of the joint.

7. In a slide-proof bell and spigot joint, for pipes and tubular elements, of the type having a seal ring between the bell and the spigot and securing elements located axially outwardly of the seal ring and pressed against the spigot end portion, according to claim 1, in which, at the wider circumferential end of each recess, a respective opening is formed in the end surface of the bell and has a size corresponding to said wedge shape pieces; said openings serving for introduction of the wedge shape pieces therethrough into said recesses.

8. In a slide-proof ball and spigot joint, for pipes and tubular elements, of the type having a seal ring between the bell and the spigot and securing elements located axially outwardly of the seal ring and pressed against the spigot end portion, according to claim 1, in which said bell has a chamber receiving said seal ring; and a radially inwardly extending annular wall separating said chamber axially from said recesses.

9. In a slide-proof bell and spigot joint, for pipes and tubular elements, of the type having a seal ring between the bell and the spigot and securing elements located axially outwardly of the seal ring and pressed against the spigot end portion, according to claim 1, in which said bell is formed with a recess receiving said seal ring; and a ring inserted into said bell and separating said chamber axially from said recesses.

* * * * *